United States Patent Office 2,979,577
Patented Apr. 11, 1961

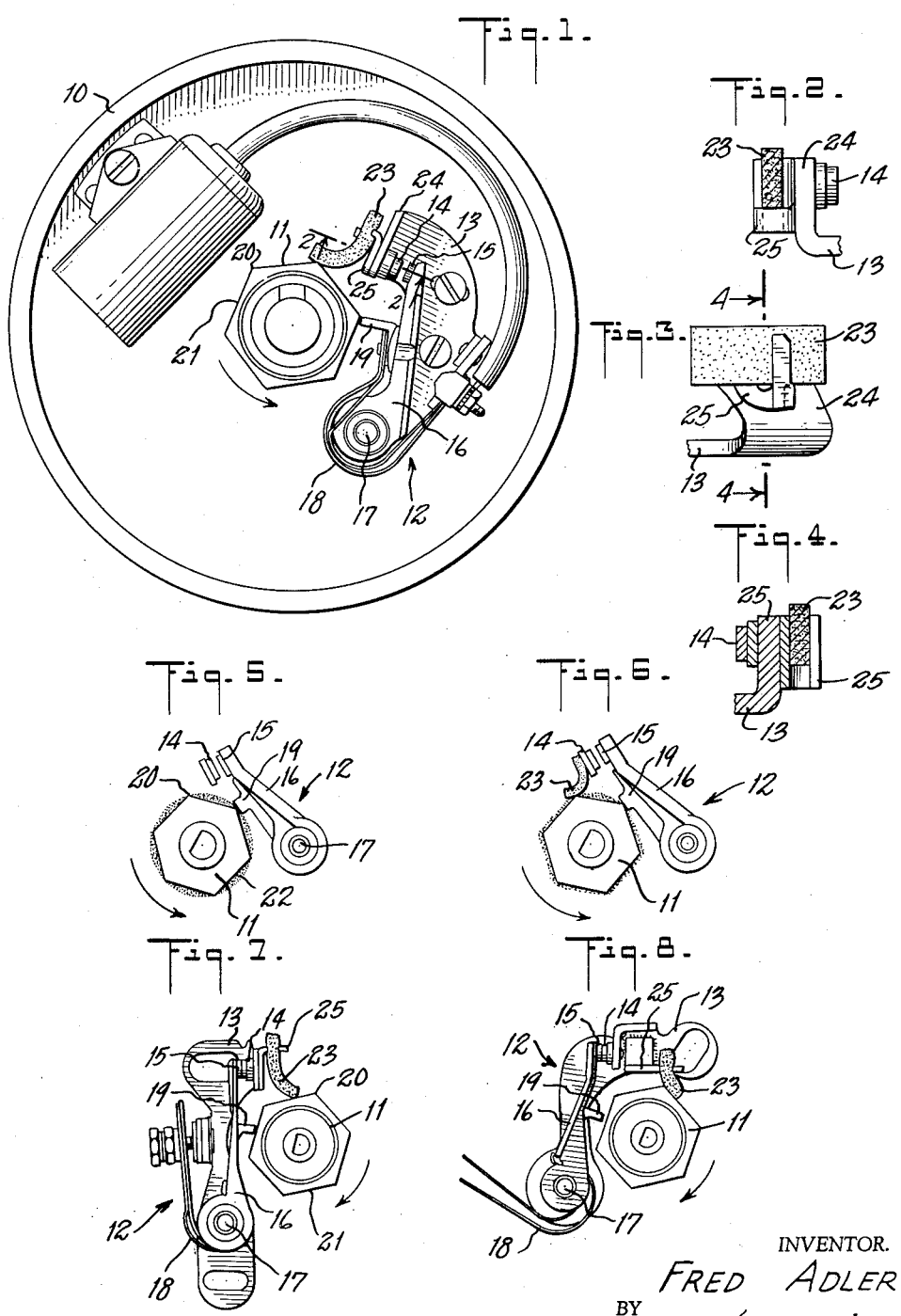

2,979,577

IGNITION POINT SET AND CAM LUBRICATOR ASSEMBLY

Fred Adler, Westbury, N.Y., assignor to Standard Motor Products, Inc., New York, N.Y., a corporation of New York Filed Mar. 26, 1958, Ser. No. 724,175

4 Claims. (Cl. 200—30)

This invention relates to an ignition point set and cam lubricator assembly in which the cam lubricator continually applies lubricant at a uniform rate on the surface of a distributor cam.

For many years the distributor assemblies used in connection with internal combustion engines have been manufactured without any provision for lubricating the rotating cam. This has the disadvantage that a portion of the follower block or shoe which contacts the rotating cam is worn away during use due to the friction developed between these surfaces. This wearing away of the follower block varies the point setting which results in faulty ignition, and shortens the gap between the points which retards the spark resulting in sluggish engine performance. This has necessitated frequent adjustment of the points or so called engine tune-up, and frequent manual lubrication of the cam surface.

Prior art attempts to eliminate this disadvantage have proven unsuccessful either because the lubricant was not applied continuously to the cam surface at a uniform rate, or because the lubricating means utilized did not lubricate the high points of the cam surface, which are the points of the cam surface contacted by the follower block, but rather removed the lubricant from these high points and deposited it on the low points or flats of the cam. In addition prior art cam lubricators are generally not part of a pre-assembled point set which renders them unsuitable for installation in existing distributor assemblies.

In view of the foregoing it is the primary purpose of the present invention to provide an ignition point set and cam lubricator assembly in which the cam lubricator continually applies lubricant at a uniform rate on the surface of a distributor cam, and distributes the lubricant evenly over the entire cam surface.

A further object of this invention is to provide a lubricating wick or pad which may be attached to the stationary contact bracket of new as well as existing ignition point sets.

Yet another object of this invention is to provide a lubricating wick or pad which may be treated to hold a reserve amount of cam lubricant sufficient to lubricate the distributor cam during the normal service life of the ignition points and which may be secured to the stationary contact bracket of new and existing ignition point sets.

For a better understanding of the present invention as well as further objects and features thereof, reference is made to the following detailed description to be read in conjunction with the accompanying drawings wherein like components in the several views are identified by like reference numerals.

In the drawings:

Figure 1 is a top view of a distributor with the cap removed to expose the interior thereof and showing the ignition point set and cam lubricator assembly of the present invention with the cam lubricator mounted on the stationary contact bracket of the ignition point set.

Figure 2 is an end elevation of a portion of the ignition point set illustrated in Figure 1 showing the distributor cam lubricator of the present invention and the bracket for mounting it on the stationary contact bracket, the parts being shown on an enlarged scale.

Figure 3 is a side elevation at right angles of the parts illustrated in Figure 2.

Figure 4 is a cross-section taken on line 4—4 of Figure 3.

Figure 5 is a top view of a portion of a distributor assembly illustrating the effect on the cam when no distributor cam lubricator is used.

Figure 6 is a view similar to Figure 5 but including the distributor cam lubricator of the present invention and illustrating some of its advantages.

Figure 7 is a top view of a modified distributor cam and ignition point set and cam lubricator assembly, and illustrates another method of mounting the distributor cam lubricator of the present invention on the stationary contact bracket of the point set, and Figure 8 is a view similar to Figure 7 but illustrating another modification and method of mounting the distributor cam lubricator of the present invention.

Referring now to the drawings, and particularly to Figure 1, there is shown an ignition distributor 10 with the cap removed illustrating the interior thereof as well as the adaptability of the ignition point set and cam lubricator assembly of the present invention. The ignition distributor 10 illustrated is of the type used in connection with internal combustion engines and only those details are illustrated which are pertinent to the present invention. The distributor 10 has a central polygonal rotating cam 11 and a pre-assembled ignition point set indicated generally by the numeral 12. The ignition point set 12 is of the pre-assembled type adapted to be easily removed and replaced by another unit and is generally a switching device of the make and break type.

The pre-assembled ignition point set 12 includes a stationary bracket 13 which mounts the stationary breaker point 14 and is mounted in the distributor 10 in the usual manner. The movable breaker point 15 is mounted on rocker arm 16 which is pivotally attached at 17 to bracket 13, the rocker arm 16 being biased by spring 18 so that the breaker points 14 and 15 are normally in contact. These pre-assembled point sets 12 may be made in many different sizes and shapes depending upon the space available in the distributor 10 and the manner of mounting the point set.

The point set 12 includes in addition to a stationary contact bracket 13 and a spring biased rocker arm 16 a conventional follower or rocker arm block 19. This follower block 19 is mounted on the pivoted rocker arm 16 approximately centrally between the ends thereof in such manner as to be adjacent the cam 11. The purpose of the follower block 19 is to contact the high points 20 of the cam 11, and when such contact is made rocker arm 16 is pivoted so that point 15 is moved out of contact with stationary point 14. As the cam continues to rotate rocker arm 16 is oscillated so that contact is made and broken between the points 14 and 15 a predetermined number of times for each revolution of the cam. The rate of oscillation of the rocker arm 16 for each revolution of the cam 11 is determined by the number of high points 20 on the cam, i.e. whether the cam is hexagonal, octagonal, etc. in cross-section. Due to the contact between the surface of the cam 11 and the end of the follower block 19 a portion of the follower block will eventually be worn away, and the extent of this wear is dependent on how well these parts are kept lubricated.

As is well known to those in the art it is difficult to keep the cam surface lubricated and unless the distributor cap is periodically removed and the cam surface manually lubricated, the follower block will be rapidly worn away. Another difficulty is that even when the surface of the cam 11 is manually lubricated the lubricant does not remain uniformly on the surface of the cam. This is due to the action of follower block 19 on cam 11 and is illustrated by Figure 5. Due to the fact that the follower block contacts mainly only the high points 20 of the cam and not the flats 21, the lubricant 22 is quickly removed from the high points and deposited on the flats. This results in an increase in friction between the cam and follower block and consequent undesirable wearing away of the follower block. As the follower block becomes shorter the point setting is changed resulting in faulty ignition and sluggish engine performance.

In accordance with the present invention a flexible resilient lubricating pad or wick 23 is secured to the stationary contact bracket 13 in such manner that the pad 23 is in continual sliding contact with the surface of the cam 11. The pad 23 is preferably of felt or some other porous absorbent resilient material which will hold a reserve amount of cam lubricant sufficient to lubricate the cam during the normal life of the points 14 and 15. As illustrated in Figure 1 the lubricating pad 23 is mounted on the flanged portion 24 of the stationary contact bracket 13, and on the face of this flange portion 24 opposite the face on which the stationary ignition point 14 is mounted. The lubricating pad 23 is maintained in position by a generally U-shaped bracket 25 which is secured to the flange 24. The bracket 25 is so proportioned as to frictionally engage the lubricating pad 23 and hold it securely in position. The slotted opening in the U-shaped bracket 25 is preferably smaller in width than the width of the pad 23. In inserting the pad 23 in the bracket 25 the pad is first compressed and then slipped into the opening in the bracket 25. Due to the resilience or springiness of the pad 23 it will return to its original size and be frictionally held by the bracket 25. In this manner the pad may be quickly removed and replaced.

As illustrated in Figure 1 the ignition point set 12 is preferably mounted in the distributor 10 in such manner that the lubricating pad is bent away from the point set 12 by the rotation of the cam 11. This is desirable in order to prevent the lubricating pad 23 from interfering in any manner with the normal operation of the ignition point set 12. Due to the resilience or springiness of the pad 23 it will remain in sliding contact with the cam 11.

It is to be understood that although the desired manner of mounting the lubricating pad 23 has been described there are numerous other ways in which it can be mounted. The only requirement on the manner and place of mounting the lubricating pad 23 is that it be mounted on the stationary contact bracket 13 in such manner as to be in continual sliding contact with the surface cam 11. By mounting the lubricating pad 23 in this manner on the stationary contact bracket 13 the lubricating pad performs several functions. Since it is in continual sliding contact with the surface of the cam it functions as a wiper to distribute the lubricant uniformly around the periphery of the cam, i.e. prevent undue accumulation of lubricant on portions of the cam. In addition, the lubricating pad supplies lubricant at an even rate to the cam surface thereby decreasing the friction between the cam and follower block, and preventing undesirable wearing away of the follower block. In Figure 7 and 8 two modified pre-assembled ignition point sets are illustrated.

One of the advantages of the distributor cam lubricator of the present invention is illustrated by a comparison of Figures 5 and 6. In Figure 5 there is illustrated a cam 11 and a portion of a pre-assembled ignition point set 12 without any means being provided for automatically lubricating the cam 11. As can be seen from this figure the follower block 19 removes the lubricant 22 from the high points 20 of the cam 11 and deposits it on the flats or low points 21. With this embodiment after a short period of operation the lubricant is removed from where it is needed and deposited where it can accomplish no useful purpose. In Figure 6 the same parts are illustrated with the addition of the distributor cam lubricating pad 23 of the present invention. As can be seen from this figure the lubricating pad 23 prevents an excess accumulation of lubricant 22 on the flats 21 of the cam 11 where it is not needed and continually lubricates the high points 20 where the lubricant is needed. In addition due to the absorbent nature of the lubricating pad 23 it may be treated with a reserve amount of cam lubricant which will be deposited on the cam surface as it is needed. The width of the lubricating pad 23 is preferably approximately the same as the width of the follower block 19. In this manner those portions of the cam which the follower block contacts are kept properly and uniformly lubricated.

What has been described is an ignition point set and cam lubricator assembly which is inexpensive to manufacture and which may be readily applied to existing as well as new distributors. Due to the fact that the lubricating pad is mounted on the stationary contact bracket of the ignition point set the lubricating pad exerts a continual lubricating and wiping action on the cam surface, rather than an intermittent lubricating and wiping action which would prevail if the lubricating pad were mounted on the pivoted rocker arm 16.

I claim:

1. A pre-assembled ignition point set for internal combustion engine distributors provided with a rotary polygonal cam, said set comprising a bracket for removably mounting said set on said device and having a flanged portion at one end thereof, a stationary electrical contact affixed to said flanged portion, a rocker arm pivotally mounted on the other end of said bracket, a follower block secured to said arm approximately centrally between the ends thereof and engageable with said cam whereby said rocker arm is caused to oscillate as said cam rotates, a movable contact mounted on said arm in cooperative relation with said stationary contact whereby as said arm oscillates said movable contact intermittently engages said stationary contact on said flange, and a flexible absorbent pad impregnated with lubricant secured to said flange and continuously engaging the periphery of said cam to deposit and uniformly distribute lubricant on the surface thereof.

2. A pre-assembled ignition point set for internal combustion engine distributors provided with a rotary polygonal cam, said set comprising a bracket for removably mounting said set on said device and having a flanged portion at one end thereof, a stationary electrical contact affixed to said flanged portion, a rocker arm pivotally mounted on the other end of said bracket, a follower block secured to said arm centrally between the ends thereof and engageable with said cam whereby said rocker arm is caused to oscillate as said cam rotates, a movable contact mounted on said arm in cooperative relation with said stationary contact whereby as said arm oscillates said movable contact intermittently engages said stationary contact on said flange, and a flexible absorbent pad impregnated with lubricant secured to said flange on the reverse face of said flange to which said stationary contact is affixed, said pad continuously engaging the periphery of said cam to deposit lubricant thereon and uniformly lubricate the surface thereof.

3. A pre-assembled ignition point set in accordance with claim 2 wherein said pad is rectangular in cross-section with a width approximately the same as the width of said follower block.

4. A pre-assembled ignition point set for internal combustion engine distributors provided with a rotary polygonal cam, said set comprising a stationary detachable base plate, a stationary electrical contact mounted on said plate, a rocker arm pivotally mounted on said plate and formed with an electrical contact movable to and from position to engage said stationary contact on movement of said pivotally mounted arm, a follower block positioned to engage said polygonal cam and biasing means for moving said arm toward said stationary contact and cam, and a resilient flexible absorbent pad on said plate, an open U-clamp secured to said plate for mounting said pad, the opening in said U-clamp being of less width than the normal uncompressed width of said pad to cause said pad to be held firmly in position when forced into said U-clamp, said pad being formed with sufficient rigidity to cause the free end thereof to contact the entire contour of said cam during rotation of the latter for supplying and distributing lubricant to the portion of said cam engaged by said follower block, said electrical contacts, rocker arm and electrical lubricating pad being removable with said base plate when detached for purposes of replacement or repair.

References Cited in the file of this patent

UNITED STATES PATENTS

| | | |
|---|---|---|
| 1,517,653 | Rhoades | Dec. 2, 1924 |
| 2,034,683 | Olandt | Mar. 17, 1936 |
| 2,191,087 | Spengler | Feb. 20, 1940 |
| 2,464,779 | Brownlee et al. | Mar. 15, 1949 |
| 2,564,832 | Clark | Aug. 21, 1951 |
| 2,664,474 | Chermendy | Dec. 29, 1953 |
| 2,700,432 | Hieger | Jan. 25, 1955 |
| 2,752,436 | Phelon | June 26, 1956 |
| 2,773,113 | Alstrom | Dec. 4, 1956 |
| 2,786,087 | McGrevy | Mar. 19, 1957 |
| 2,832,855 | Armstrong | Apr. 29, 1958 |
| 2,851,456 | Phelon et al. | Sept. 9, 1958 |

FOREIGN PATENTS

| | | |
|---|---|---|
| 521,224 | France | Mar. 3, 1921 |